United States Patent

[11] 3,574,416

[72] Inventor Derek Robert Skoyles
East Grinstead, England
[21] Appl. No. 771,561
[22] Filed Oct. 29, 1968
[45] Patented Apr. 13, 1971
[73] Assignee U. S. Philips Corporation
New York, N.Y.
[32] Priority Oct. 31, 1967
[33] Great Britain
[31] 49462/67

[54] ANTI-LOCK BRAKE SYSTEMS
3 Claims, 4 Drawing Figs.
[52] U.S. Cl. .................................................. 303/21,
188/181, 303/10, 303/61, 303/69
[51] Int. Cl. ........................................................ B60t 8/02
[50] Field of Search ............................................ 303/6, 21,
24, 61—63, 68—69; 188/181

[56] References Cited
UNITED STATES PATENTS
3,032,995  5/1962  Knowles ...................... 303/61UX
3,276,822  10/1966  Lister et al. .................. 303/24
2,919,162  12/1959  Roberts ........................ 303/21
3,089,734  5/1963  Jankus ......................... 303/61X Primary Examiner—Milton Buchler
Assistant Examiner—John J. McLaughlin
Attorney—Frank R. Trifari ABSTRACT: An antilock hydraulic brake control system for a wheeled vehicle. A first control valve actuated by a wheel speed-reduction sensor in response to wheel locking, operates to relieve the pressure in the brake cylinder by diverting the brake fluid to a reservoir, which fluid closes a second valve controlling the hydraulic flow from the master cylinder. Upon resumption of the wheel rotation a scavenging pump in communication with the reservoir, will be activated and the fluid pressurized by the pump will open the second valve so as to permit hydraulic pressure from the master cylinder to be reapplied to the brake cylinder.

ANTI-LOCK BRAKE SYSTEMS

This invention relates to antilock brake systems for wheeled vehicles, i.e. systems designed to improve braking performance by releasing a wheel brake automatically if the wheel tends to lock on a slippery surface and then permitting further braking action without the need for any change in the action of the person using the brake. Such systems can be successful in reducing the risk of skidding due to wheel lock and will aid in maintaining directional control and reducing braking distances.

In one known hydraulic system the fluid must be pumped continuously so as to maintain a pressurized supply of oil for the brake, and the antilock control device bypasses some of the fluid from the brake cylinder when it is necessary to relieve the pressure therein.

There are other antilock systems which have been designed for use with hydraulic brake apparatus of the master cylinder type, and examples of such antilock systems are described in British Pat. specification No. 1,101,078.

It is an object of the present invention to provide an alternative antilock brake control system which can employ relatively small and light equipment having relatively fast action. By contrast, many previous antilock brake actuators have the disadvantage of being bulky; this is due to the necessity of storing sufficient energy to reapply the brake after antilock action. Because of the bulky equipment associated with the transfer of such a large amount of energy, it is often difficult to remove the brake pressure with sufficiently rapidity for optimum working of the antilock system.

The invention provides an antilock brake control system for a wheeled vehicle and has a hydraulic pressure line from a master cylinder to a wheel brake controlled by the system, an antilock control valve adapted for actuation by an actuator in response to sensor signals from a wheel speed reduction sensor, a connection from said brake to a reservoir which connection is adapted to be opened by said antilock control valve when the latter is actuated, a scavenging pump for scavenging fluid from the said reservoir back to the brake and/or to the master cylinder, means for activating said pump in response to an increase in the volume of the fluid in said reservoir beyond a datum value, and limiting means for preventing or reducing further flow of fluid from the master cylinder to the brake during at least part of any period of antilock action.

The wheel speed sensor and the associated means for providing the antilock control force do not form an integral part of the system and may be of known type. The associated means may be typically, an electromagnet. The sensor may be associated with the wheel as a deceleration sensor which applies signals to the electromagnet via a suitable signal-processing circuit. The signal processing can be done in various ways and according to various criteria. One simple criterion (though not the ideal one) is for the sensor signals to be rendered effective or passed to the electromagnet only when the sensor registers a wheel deceleration which exceeds a predetermined value. This can readily be done with an electromagnetic sensor in the form of a generator whose output has a voltage which is a function of deceleration, and a processing circuit which comprises a voltage threshold detector of known type followed by a suitable amplifier.

The invention is applied to master cylinder systems because such systems (as opposed to systems of the aforesaid continuously pumped type) cannot tolerate any material loss of pressurized hydraulic fluid. The scavenging pump or pumps used in the invention avoid such loss of fluid by taking fluid that has been released (for antilock purposes) from the brake and returning it from the reservoir (where it lies at a lower pressure) to the pressurized part of the system (in practice the master cylinder and/or one or more brake cylinders).

Thus a scavenging pump according to the invention pumps fluid away from the reservoir and it only operates occasionally (even if leakage is provided as explained later, such leakage only occurs during braking). By contrast the said continuously pumped systems require pumping into a high-pressure reservoir at all times, or at least for sufficiently long and frequent periods to maintain a high-pressure supply of brake fluid at all times.

The term "master cylinder" is used herein to cover not only the normal case in which the driver actuates directly the piston in the master cylinder, but also cases where a pneumatic servo or amplifier is interposed between the driver and said piston.

The scavenging pump may be adapted to scavenge back solely to the brake while the limiting means are adapted to completely prevent the flow from the master cylinder when the reservoir fluid exceeds the said datum value. In an example of such an arrangement (described later with reference to FIG. 2) the limiting means comprise a volume-limiting valve inserted in the pressure line provided between the master cylinder and the control valve and controlled by fluid pressure in the reservoir.

As an alternative the pump may be adapted to scavenge back to the master cylinder. In this case the limiting means may be adapted to provide a leakage path from the master cylinder to the brake during braking, and this can ensure fail safe action in the event of failure of the scavenging pump (an example of this will be described as a variant of the arrangement of FIG. 2).

As a further alternative, the system may comprise a scavenging pump for pumping back to the brake (e.g. from one reservoir) and a separate second pump for pumping back to the master cylinder (e.g. from a second reservoir or from a reservoir common to both pumps). Such a compound system is capable of adapting the antilock action automatically to changes (even sudden changes) in the quality of the road surface. In addition it can provide, as an inherent property, the fail-safe action referred to above. An example of such an arrangement will be described with reference to FIG. 3 wherein a volume-limiting valve is shown controlled by fluid in the reservoir associated with either pump or reservoir common to both pumps.

Any of these arrangements may employ a single control valve for the four wheels of a four-wheeled vehicle. Preferably, however, the system includes a separate control valve for each wheel or, alternatively, a separate control valve for each of the two front wheels and a further control valve associated jointly with the two rear wheels (in such cases there may be a separate reservoir for each control valve or a single reservoir common to all). The speed reduction sensor means (which do not form an essential part of the invention) may follow a similar pattern—in particular, in the latter case a single sensor may be provided on the propeller shaft and associated with two rear wheels driven thereby. In a similar manner, a single scavenging pump may serve two or more reservoirs or all the reservoirs. However, these considerations do not affect the explanation of the mode of operation of the systems and therefore, the examples described below can be regarded, for simplicity, as based on the provision of complete antilock system (i.e. antilock control valve, reservoir, scavenging pump and limiting means) for each wheel.

Power for driving the or each scavenging pump may be derived from a road wheel or associated wheel drive means. The means for providing such power are also not an integral part of the system. In a simple case they may be provided separately as a modification of a conventional wheel hub or brake drum on which one or more projecting cam surfaces are provided for engagement with a piston projecting from the pump chamber. Such arrangements will be described below in the examples.

Specific embodiments of the invention will now be described by way of example with reference to the accompanying diagrammatic drawings in which.

From these examples it will be seen more clearly how the arrangements are designed to reduce hydraulic brake pressure when the wheel tends to lock and also to restore pressure when the wheel is accelerating after antilock action. It will also be seen that each of the arrangements can be small because it does not have to store energy, and can also be rapid in its control action due to being small.

Figure 1:
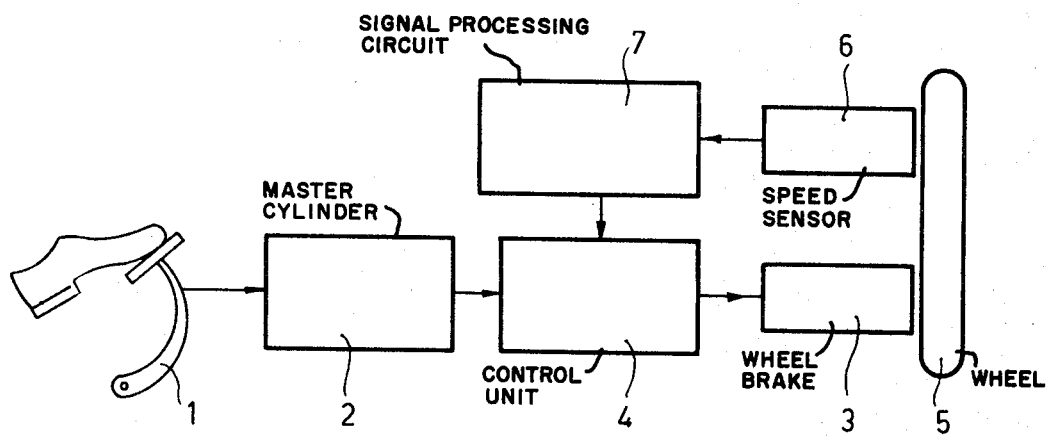
FIG. 1 shows a general brake control layout.

A general layout is given as FIG. 1 of the accompanying drawings which is a block schematic diagram showing a foot pedal 1 which actuates the piston of the master cylinder 2. The latter actuates (directly or via a servo) the wheel brake 3 via the antilock control unit 4, said unit including an electromagnet.

Associated with the wheel 5 is a wheel speed-reduction sensor 6 which applies signals to the electromagnet via a suitable signal-processing circuit 7.

The signal processing can be done in various ways and according to various criteria as aforesaid.

Examples of antilock control units embodying the invention will now be described with reference to FIGS. 2 and 3.

Figure 2:
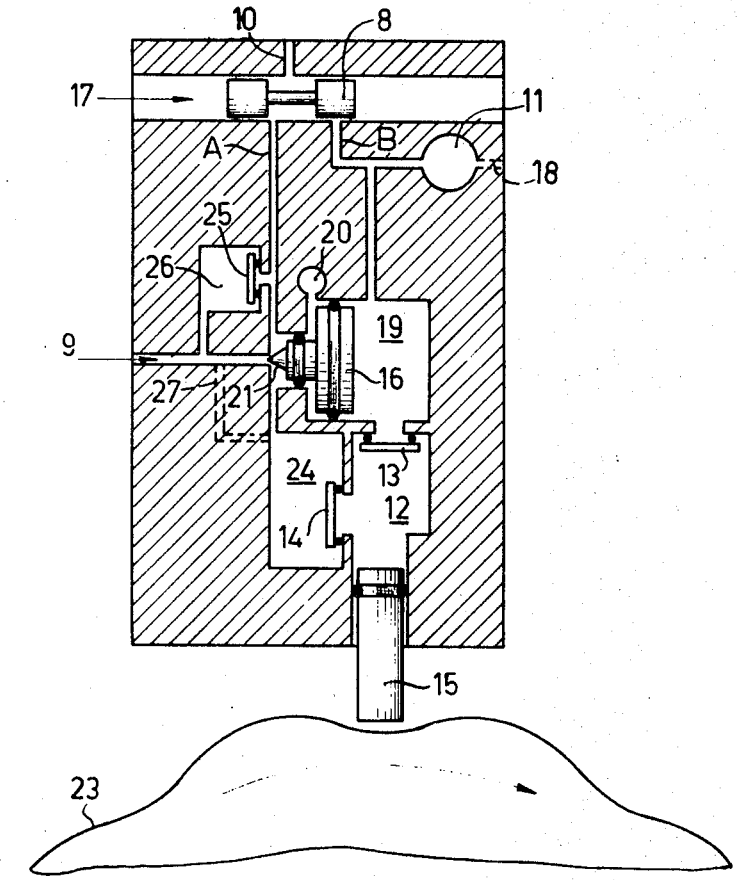
FIG. 2 shows a first embodiment employing a single scavenging pump.

FIG. 2 shows schematically a first type of arrangement. This arrangement employs a two-way antilock control valve 8 with one of its "ways" inserted in the pressure line from the master cylinder input 9 to the outlet 10 for the brake cylinder (this valve may be of the so-called "spool" type as shown). There is a connection from the other "way" of valve 8 to a reservoir 11 and to a scavenging pump 12. The latter has valves 13–14 and a piston 15. A volume-limiting valve 16 is inserted in the pressure line 9–10. The action is as follows, assuming that an electrical antilock signal 17 is available for an electromagnet (not shown) to cause the latter to move valve 8 to the right when it is required to release the brake:

1. When the wheel tends to lock, the electrical antilock signal energizes the actuator and the latter moves valve 8 from line 9 (path A) to the reservoir 11 (path B).
2. The movement of valve 8 causes (directly or indirectly) a blocking of further fluid from the master cylinder. It also opens the brake cylinder to reservoir 11.
3. The flow of brake cylinder fluid into the reservoir 11 allows the wheel to unlock and starts to fill this reservoir.
4. When the volume of brake fluid in the reservoir 11 has reached a value greater than the predetermined datum value, it is required that it should initiate the scavenging pump action by which said fluid is removed from this reservoir and forced back into the pressurized part of the hydraulic circuit. In a preferred case this is done in a simple manner by ensuring that the increasing volume of fluid in the reservoir forces outwardly the piston 15 of the pump to a position where it contacts a cam on (or driven by) the wheel.
5. The renewed rotation of the wheel due to the antilock action and the resultant rotation of the cam cause scavenging of brake fluid from the reservoir to the brake or to the master cylinder (or both) depending on the type of valve control (the action of valve 16 will be explained later in more detail).

Valve 16 can take the form of a differential valve having two ring seals, and valves 13,4 can be (as shown) flap valves having ring seals. In this specific example valve 8 is a spool valve shown in its normal position where it allows fluid flow from line 9 to brake 10. When the spool valve 8 is shifted to the right as a result of an antilock signal, further fluid flow from the master cylinder to the brake is blocked by the spool and the brake cylinder is opened to reservoir 11.

Valve 16 operates as follows. The increasing volume of fluid in the reservoir 11 pushes valve 16 to the left so that it forms an additional block to the master cylinder fluid. The fluid in 11 also forces piston 15 of the pump outwardly until it contacts the wheel cam. The flow of fluid from the brake is sufficient to allow the wheel to rotate more freely (or unlock). As a result the cam causes fluid to be scavenged from the reservoir 11 and pumped back to the brake 10 or to the master cylinder depending on the position of the valve 8 or the mode of working.

As a more detailed explanation of the arrangement of FIG. 2, it will be seen that the spool valve 8 is shown in the position in which master cylinder pressure is applied directly to the brake via path A of the spool valve, path B being closed in this condition. When an antilock signal occurs, the spool valve 8 is moved to the right so as to shut path A and open path B. Compressed fluid from the brake cylinder is then allowed to expand via path B into the reservoir which may be a small chamber as indicated at 11 or, alternatively, an external reservoir connected to the corresponding outlet 18. This expanding fluid also flows into chamber 19 (which acts as part of 11) where it acts so as to urge the differential limiting valve 16 towards the left. This valve 16 is provided for the purpose of limiting the volume of fluid supplied by the master cylinder during antilock operation. As will be seen, the small-diameter part of the valve moves in an annular air chamber which is connected to a small expansion space 20 in order to allow movement of the valve. The small-diameter part of valve 16 is provided with a conical valve element 21 which, when valve 16 is under pressure from chamber 19, closes the input line 9 and thus shuts off master cylinder pressure thereby aiding the spool valve which is already performing the same function by having shut its path A.

Pressure from the brake cylinder via reservoir 11 and chamber 19 also acts so as to open valve 13 and increases the pressure in chamber 12 thereby causing the piston 15 of the pump to project outwardly into engagement with cam 23. Thereafter the pumping action of the piston 15 closes valve 13 and opens valve 14 these two valves forming part of the pump. Fluid thus pumped into chamber 24 rises along the duct past the conical valve element 21 and then takes one or the other of two courses depending on the condition of the spool valve 8. If the latter is still over to the right with path A closed, the pumped fluid will open a valve 25 into a further chamber 26 which in effect forms part of the master cylinder input, and the pumped fluid thus increases the available master cylinder pressure. Alternatively, if release of the brake has had time to reduce the wheel speed sufficiently to reduce or stop the antilock signal so that the spool valve can return to its normal or left-hand position, then the pumped fluid will rise past the valve 25 and will flow through path A to the brake thereby accelerating the reapplication of the brake. (Valve 25 may not always be necessary—it prevents undue pressure buildup if the pump is working when valve 8 has not yet returned to its left-hand position).

It may thus be said that the spool valve in this example performs two separate actions. (a) It determines whether the brake should be connected to the master cylinder supply or released by connection to the reservoir. (b) It determines whether fluid pumped into chamber 24 by the pump is directed back to the master cylinder supply 9 or alternatively past element 21 into the brake cylinder to assist application of the brake.

This simple system allows for brake "fade" in that further pressure will be available from the master cylinder when the reservoir has been scavenged to a low pressure thereby allowing valve 16 to open so as to admit more fluid from the master cylinder.

The arrangement of FIG. 2 can be modified in various ways. Thus, for example, the connection from chamber 24 to the valve element 21 can be shut off and replaced by a connection from chamber 24 to line 9 e.g. as indicated at 27. This effectively causes the scavenged fluid to be directed back to the master cylinder rather than to the brake.

Figure 2A:
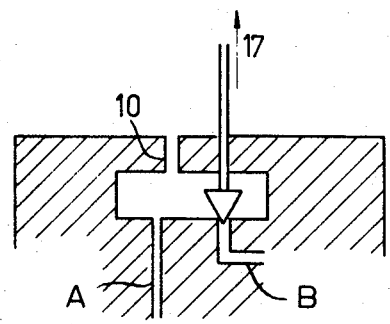
FIG. 2A shows another type of valve which may replace spool valve 8.

As a further variant the spool valve 8 may have its stem extended to the left so that the left-hand valve slide never reaches a position where it can shut off the path A from the master cylinder. Spool valve 8 can then be replaced by a valve e.g. as shown in the inset of FIG. 2 (FIG. 2A).

As yet another variant, the valve element 21 (and/or its seating) may be designed to allow a leakage path (from 9 to 10) even when the valve 16 is in its extreme or "closed" position (movements of 16 can then be designed to control the degree of leakage in dependence upon volume or pressure in the reservoirs 11 and 19). Alternatively, a leakage path may be provided in a similar manner by modifying valve 25 and/or its seating.

To allow for the condition which is the converse of brake "fade," i.e. when antilock control is needed on a slippery surface immediately after a good surface, other modifications are possible.

Figure 3:
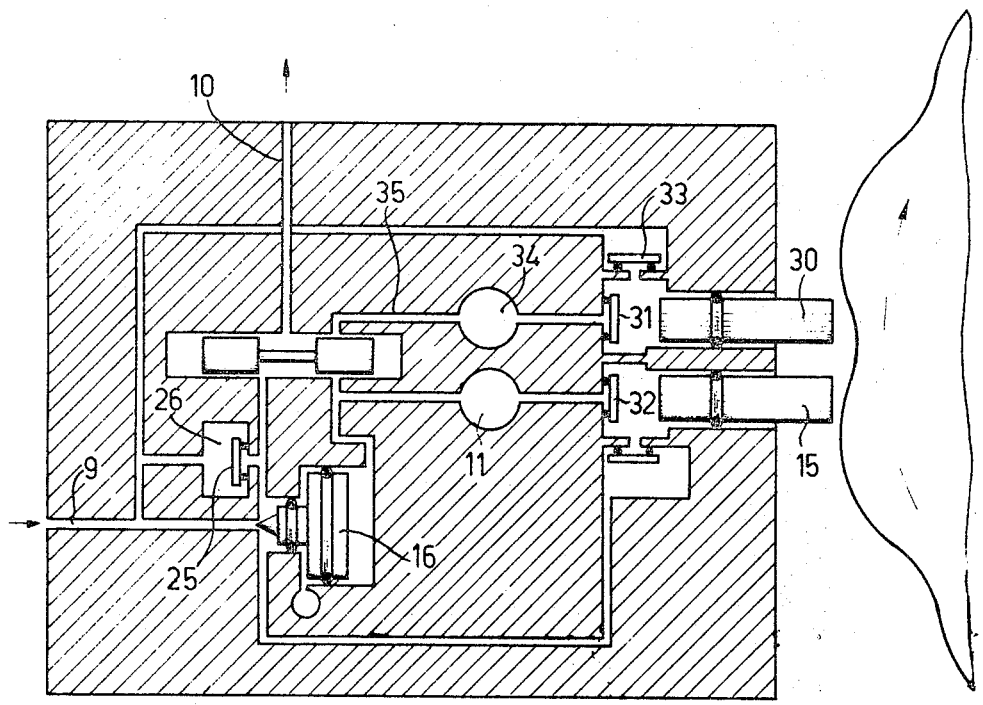
FIG. 3 shows a second embodiment in the form of a compound system employing two separate scavenging pumps.

One example of a modification is shown in FIG. 3 which shows an arrangement identical with that of FIG. 2 except that:

a. A second pump 30 is added (with valves 31,32) to the existing pump 15.
b. Its output chamber 33 is connected to line 9 in a direct manner instead of via valve 25—chamber 26.
c. The spool valve 8 opens the brake cylinder to a second reservoir 34 in addition to the first. The inlet of that reservoir is restricted at 35; it is therefore fully used only when the spool valve 8 is held in the antilock position for periods longer than normal.

Fluid in reservoir 34 can be pumped directly back to the master cylinder (instead of via valve 25) since it is excess to the needs of that particular slippery surface. Some fluid will enter under normal antilock conditions, but this will merely cause a gradual reduction of brake pressure which is intermittently replaced when valve 16 opens. Although two reservoirs are shown, a single common reservoir can be used.

Conventional systems employ electromagnetic means for controlling mechanical (e.g. hydraulic) brake control means. Such systems also employ means for the "processing" of the signals, i.e. for the conversion from initial sensor or wheel speed information to a signal representing simply the required "on" and "off" periods of the antilock action. In the present invention the processed signals determine the instant when antilock (i.e. brake release) action is initiated, and this corresponds to the conventional mode of operation.

However, the invention departs from said simple mode in that, although the instant of cessation of antilock action (i.e. reapplication of the brake) also may be determined by the processing means, the actual mechanical reapplication of the brake is considerably influenced by the mechanical means described above. These means themselves can be said to further process the basic "lock-unlock" information already received from the normal processing arrangement. In the arrangement of FIG. 3 (and to some extent also in the arrangement of FIG. 2) this is done in such a way as to modify the control of brake reapplication to best suit the particular existing road conditions.

I claim:

1. An antilock brake control system for a wheeled vehicle which system comprises a hydraulic pressure line from a master cylinder to a wheel brake controlled by the system, an antilock control valve adapted for actuation in response to sensor signals from a wheel speed-reduction sensor, a connection from said brake to a reservoir adapted to be opened by said antilock control valve when the latter is actuated, said reservoir being at a lower pressure than the remaining system, first pump means adapted to scavenge fluid back to the brake, means for activating said first pump means in response to an increase in the volume of the fluid in said reservoir beyond a datum value, means for limiting flow of fluid from the master cylinder to the brake during at least part of any period of antilock action, and second pump means adapted to scavenge fluid back to the master cylinder.

2. A system as claimed in claim 1 including a volume-limiting valve for the pressure line between the master cylinder and the control valve and controlled by fluid in a reservoir associated with, at least one pump.

3. An antilock brake system for use with a wheeled vehicle having a master cylinder connected by a hydraulic pressure line to a wheel brake cylinder and comprising at least one reservoir, a pressure relief line connecting the brake cylinder and the reservoir, first valve means interposed between the brake cylinder and the reservoir, wheel speed-reduction sensor means for activating the first valve means to place the brake cylinder in communication with the reservoir in response to wheel locking thereby relieving the pressure in the brake cylinder, second valve means for controlling the fluid flow from the master cylinder to the brake cylinder, said second valve means being activated by the fluid in the reservoir to limit the flow of fluid to the brake cylinder thereby releasing the locked wheel, and pump means activated by the rotation of the wheel for forcing the hydraulic fluid from the reservoir to the master cylinder for reapplication of the braking action.